March 11, 1969 — M. D. GERKE — 3,431,569
DAY-NIGHT WATER MARKER
Filed March 14, 1967
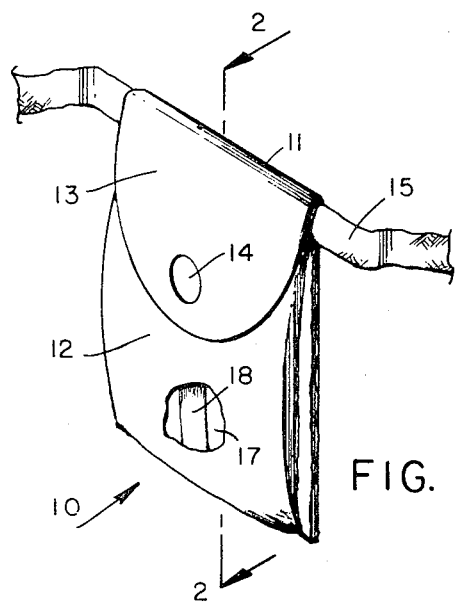
FIG. 1.
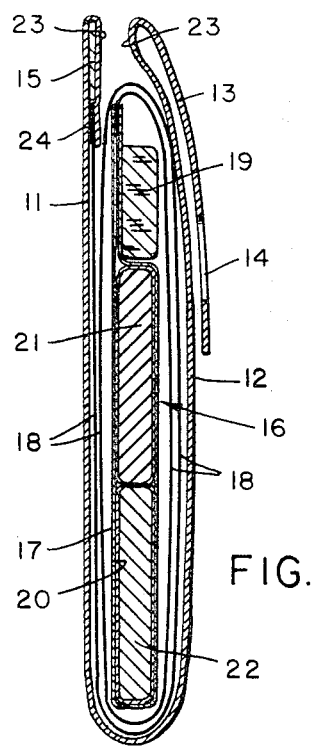
FIG. 2.
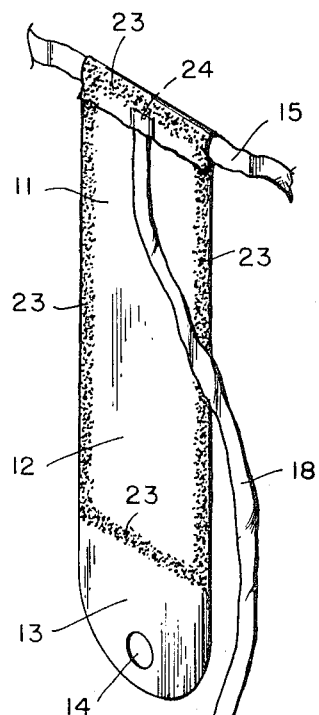
FIG. 3.
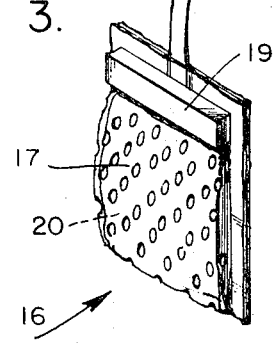
INVENTOR.
MERRILL D. GERKE
BY
ROY MILLER
ATTORNEY.

United States Patent Office 3,431,569
Patented Mar. 11, 1969

3,431,569
DAY-NIGHT WATER MARKER
Merrill D. Gerke, Imperial Beach, Calif., assignor to the United States of America as represented by the Secretary of the Navy
Filed Mar. 14, 1967, Ser. No. 624,118
U.S. Cl. 9—311                   2 Claims
Int. Cl. B63c 9/20, 9/00; B65d 85/70

ABSTRACT OF THE DISCLOSURE

A device for disseminating dyes, pigments, chemiluminescent formulations and the like for use as an emergency target signal and day-night sea marker. The device comprises a waterproof envelope having sealed inside a perforated plastic packet which holds a water permeable receptacle containing the marker material. The packet is provided with a float and is fastened to the inside of the envelope by a length of flexible tether. The envelope has a flap with a reinforced fingerhole for ease in opening. In operation, a finger is inserted in the fingerhole, some pressure is exerted which rips open the sealed envelope dropping the packet into the water. The float causes the packet to rise to the surface or to float and as the receptacle dissolves its contents are dispersed through the perforations in the covering of the packet onto the water.

---

The invention herein described may be manufactured and used by or for the Government of the United States of America for governmental purposes without the payment of any royalties thereon or therefor.

This invention relates to an improved day-night water marker. More particularly, it relates to a marker intended to indicate from some distance the place where a person in distress may be located at sea.

One of the hazards connected with transportation over or on water is that of survival in case of disaster. Life jackets keep individuals afloat but it remains difficult to attract attention of a rescue party. Boats or rafts may be equipped with lights, flags or radio to assist others in spotting them. Such means are too bulky for individual use. The present device provides a compact day-night marker or signal which overcomes some of the difficulties encountered in rescue efforts.

It is therefore an object of the present invention to provide a day-night marker for use as a personnel emergency rescue aid for those adrift at sea.

Another object is to provide a device which may be used as a day-night reference marker.

Yet another object is to provide a device useful to underwater demolition personnel in emergency situations.

Other objects, features and many of the attendant advantages of this invention will become readily appreciated as the same become better understood by reference to the following detailed description when considered in connection with the accompanying drawings wherein:

FIG. 1 is an elevation in perspective of the closed envelope with a portion removed showing the marking packet therein;

FIG. 2 is a cross section through 2—2 of FIG. 1;

FIG. 3 is a view of the same envelope with the flap open and the marking packet exposed.

Now referring to the drawings the device of FIG. 1 comprises an envelope generally designated by numeral 10 of waterproof or water-impermeable material. Envelope 10 may be made from a flat sheet approximately one-third of which comprises the backing 11; the middle third is folded over backing 11 to serve as the front 12 and the final third serves as a pull tab 13 which is provided with fingerhole 14. For convenience the backing could be a separate piece from the front and pull tab section. The sides are ordinarily closed by cementing to form a watertight seal. Attached to backing 11 is a fabric or plastic tape 15 used to fasten the marker to a life jacket, a person's clothing or other carrier.

In FIG. 3 packet 16 is exposed. It comprises outer covering 17 made from a perforated water-impermeable material and has secured therein receptacle 20 composed of a water permeable material which holds the dye, the chemiluminescent material or both. The edges of covering 17 and receptacle 20 may be closed by a suitable adhesive designated 23, by heat sealing or other suitable means. Covering 17 has attached to one edge tether or cord 18 the other end being attached to the inside seam of envelope 10 as shown at 24. A float 19 is attached by suitable means to the outside of covering 17 for the purpose of creating buoyancy. Tether 18 is wrapped around packet 16 and placed within envelope 10 before sealing pull tab or flap 13.

In the cross section as shown in FIG. 2, receptacle 20 is shown containing two marking materials, a dye 21 and an oxyluminescent material 22, such as tetrakis(dimethylamino)ethylene used herein which "glows" when exposed to air.

In operation all that is necessary to call attention to a location is to insert a finger in the fingerhole and exert a little force which rips open pull tab 13 on envelope 10 whereupon packet 16 falls from said envelope and the marker material contained therein is dispersed as the receptacle 20 dissolves in the water. Float 19 is an important feature of packet 16 because it keeps the packet afloat or if the packet is deployed underwater it carries the packet to the surface where the contents are dispersed. Float 19 may be of cork or other suitable material. The tether used was a reflective tape, but other material could be used. Tether 18 serves several useful purposes. Primarily it insures that packet 16 is retained close to the person in case there is a strong current and also provides a guideline in locating underwater carriers. In addition, if tether 18 is composed of a reflective tape or phosphorescent cord, it aids as a surface signal after the dye has faded beyond operational use.

So far as materials used are concerned, for the outer envelope 10 a wide choice is available. Polyethylene films of medium and low density have been successfully used. Both materials are easily sealed to provide the watertight envelope necessary to protect the marker packet. Waterproof cotton or rubber sheeting which are impervious to moisture may also be used.

The mesh-like or perforated covering 17 which contains or holds receptacle 20 may be of any waterproof fabric.

Packet 16 comprises two parts; namely, covering 17 which holds receptacle 20. Covering 17 was made from a mesh-like or perforated water impermeable plastic. The mesh fabrication is necessary to permit the marking material to pass through as the fabric of receptacle 20 dissolves. Polyethylene oxide films of various thickness were successfully used for receptacle 20 because these films are compatible with both the fluorescein dye and tetrakis(dimethylamino)ethylene, the oxyluminescent composition which is used for the nighttime signal of this invention. Other materials such as polyvinyl alcohols and gelatins may also be used. Water soluble films are generally easily sealed to insure retention of the contents.

If the marking contents be of a solid substance such as cotton or felt soaked in a chemiluminescent or a fluorescein dye, covering 17 may be closed by stitching or stapling, or by the use of any suitable adhesive. When liquid or powders are used receptacle 20 must be sealed to prevent loss of the contents within envelope 10.

In operation, after a time interval, which is determined by the kind, solubility, and thickness of the water soluble plastic of receptacle 20, and the water temperature, receptacle 20 dissolves releasing its contents through the perforations of covering 17 into the water. The operation can, at the discretion of the operator, assist dissemination of the marking material from packet 16 by hand pressure or squeezing the contents into the water.

The dye used for daylight markers may vary. However, orange or bright yellow give the best contrast in water. The material used for nighttime markers was the chemiluminescent composition, tetrakis(dimethylamino)ethylene, which "glows" when exposed to air.

Two packets, one containing a material easily visible by day and another containing material visible by night, were sealed within the envelope and provided an excellent day-night marking and signalling device. A single receptacle 20 as shown in FIG. 1 which is divided into two sections, one containing a dye 21 and the other containing tetrakis(dimethylamino)ethylene also provided a good signalling means.

What is claimed is:

1. A day-night water marker adapted to be attached to a carrier comprising:
   a flexible waterproof envelope formed from a sheet of water impervious material by sealing the edges thereof and having a pull tab means for breaking the seal;
   a marking packet within said envelope; and
   a tether comprising a flexible reflective tape connecting said packet to the interior of said envelope;
   said packet comprising a covering consisting of a perforated water impervious material, a float secured to the outside thereof, and two water pervious receptacles secured within the covering, one of said receptacles containing a water soluble coloring substance and the other of said receptacles containing a chemiluminescent compound whereby the seal may be ruptured sufficiently by the pull tab means to release the packet from the envelope.

2. The marker according to claim 1 wherein one receptacle contains a water soluble dye and the other contains tetrakis(dimethylamino)ethylene.

References Cited

UNITED STATES PATENTS

| | | | |
|---|---|---|---|
| 2,418,397 | 4/1947 | Collyer et al. | 206—5 |
| 2,750,027 | 6/1956 | Cummings | 206—5 |
| 3,297,585 | 1/1967 | Hayden | 116—124 X |

MILTON BUCHLER, *Primary Examiner.*

T. W. BUCKMAN, *Assistant Examiner.*

U.S. Cl. X.R.

9—9; 206—.5